United States Patent
Rashidi

(12) 
(10) Patent No.: US 6,550,338 B1
(45) Date of Patent: Apr. 22, 2003

(54) PRESSURE SENSING DEVICE

(76) Inventor: Ardishir Rashidi, 1408 Forest St., Upland, CA (US) 91784

( * ) Notice: Subject to any disclaimer, the term of this patent is extended or adjusted under 35 U.S.C. 154(b) by 22 days.

(21) Appl. No.: 09/611,928

(22) Filed: Jul. 7, 2000

(51) Int. Cl.[7] .................................................. G01L 7/08

(52) U.S. Cl. ..................................................... 73/715

(58) Field of Search ........................... 73/756, 715, 726, 73/721, 706; 600/486, 488; 338/42

(56) References Cited

U.S. PATENT DOCUMENTS

| | | |
|---|---|---|
| 2,190,713 A | 2/1940 | Hintze et al. |
| 3,645,139 A | 2/1972 | Zavoda |
| 3,930,823 A | 1/1976 | Kurtz et al. |
| 4,010,769 A | 3/1977 | De Lorenzo et al. |
| 4,177,496 A | 12/1979 | Bell et al. |
| 4,192,192 A | 3/1980 | Schnell |
| 4,322,980 A | 4/1982 | Suzuki et al. |
| 4,343,456 A | 8/1982 | Zitzloff |
| 4,461,181 A | 7/1984 | North, Jr. |
| 4,507,973 A | 4/1985 | Barr et al. |
| 4,653,330 A | 3/1987 | Hedtke |
| 5,063,784 A | 11/1991 | Ridenour |
| 5,167,158 A | 12/1992 | Kamachi et al. |
| 5,183,078 A | 2/1993 | Sorrell |
| 5,316,035 A | 5/1994 | Collins et al. |
| 5,357,792 A | 10/1994 | Getenby |
| 5,410,916 A | 5/1995 | Cook |
| 5,528,409 A | 6/1996 | Cucci et al. |
| 5,563,347 A | 10/1996 | Martin et al. |
| 5,604,315 A | 2/1997 | Briefer et al. |
| 5,653,191 A | 8/1997 | Calhoun et al. |
| 5,654,512 A | 8/1997 | Harnett et al. |

(List continued on next page.)

FOREIGN PATENT DOCUMENTS

| | | |
|---|---|---|
| JP | 61120419 | 12/1987 |
| JP | 03235029 A | 2/1990 |
| JP | 03048448 | 3/1991 |
| JP | 3235029 A2 | 10/1991 |
| JP | 04276373 | 10/1992 |
| JP | 5187941 A2 | 7/1993 |
| JP | 6129927 A2 | 5/1994 |
| JP | 7-72029 | 3/1995 |
| JP | 2552093 | 11/1996 |
| JP | 8-313379 | 11/1996 |
| WO | WO99/28719 | 6/1999 |

OTHER PUBLICATIONS

Slow Oil Loss In Pressure Transmitters, by Joseph Weiss, Oct. 1992.

N.T. International, Precise Sensors, Jan. 29, 1999, pp. 1–6.

Primary Examiner—William Oen
(74) Attorney, Agent, or Firm—John J. Connors; Connors & Associates, Inc.

(57) ABSTRACT

A pressure sensing device adapted to measure pressure of a fluid includes a body member made of an inert material that does not react chemically with the fluid. A thin wall diaphragm section integral with the body member carries on its exterior surface a sensor that provides a signal proportionate to the pressure of the fluid within body member. The sensor device has an exterior surface with a bridge resistor circuit mounted thereon. The cross-sectional configurations of the sensor device and the thin wall diaphragm section are complimentary so their mating surfaces fit snugly together. A liner member made of an inert material that does not react chemically with the fluid fits within the body member adjacent the first thin wall diaphragm section and includes a second thin wall diaphragm section integral with the liner member. The second thin wall diaphragm section has an exterior surface of a shape that conforms to the interior surface of the first thin wall diaphragm section and abuts and covers substantially the entire interior surface of the first thin wall diaphragm.

35 Claims, 10 Drawing Sheets

U.S. PATENT DOCUMENTS

| | | |
|---|---|---|
| 5,656,780 A | 8/1997 | Park |
| 5,657,001 A | 8/1997 | Wilson |
| D383,436 S | 9/1997 | Cucci et al. |
| 5,668,322 A | 9/1997 | Broden |
| 5,672,832 A | 9/1997 | Cucci et al. |
| 5,693,887 A | 12/1997 | Englund et al. |
| 5,822,173 A | 10/1998 | Dague et al. |
| 5,822,200 A | 10/1998 | Stasz |
| 5,852,244 A * | 12/1998 | Englund et al. ............... 73/706 |
| 5,869,766 A | 2/1999 | Cucci et al. |
| 5,878,000 A | 3/1999 | Dobois |
| 6,029,524 A * | 2/2000 | Klauder et al. ............... 73/718 |

* cited by examiner

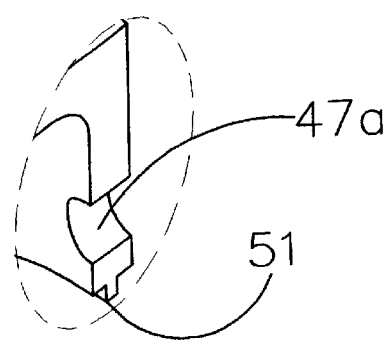
FIG. 5A
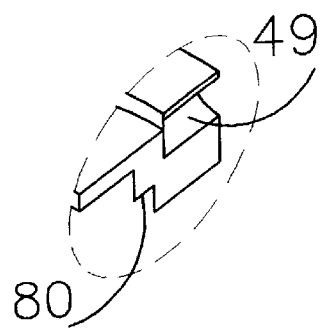
FIG. 5B
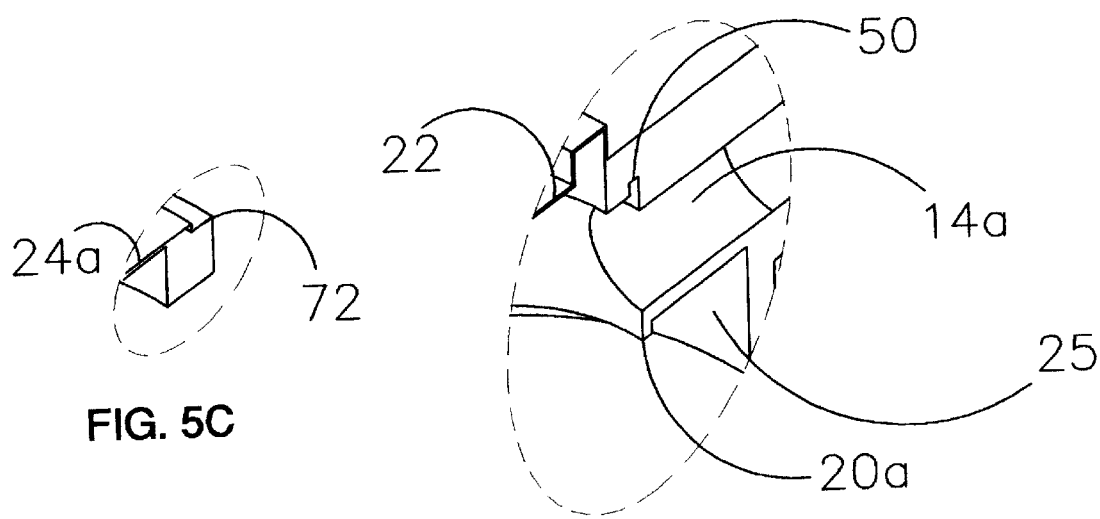
FIG. 5C
FIG. 5D
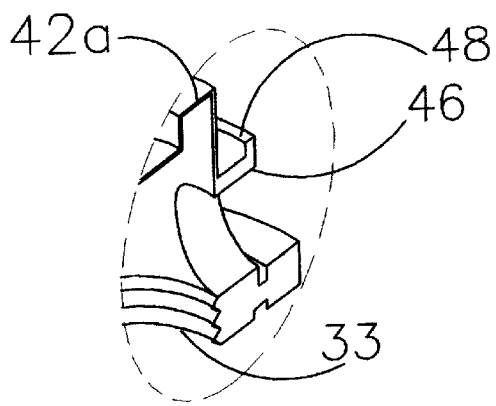
FIG. 5E
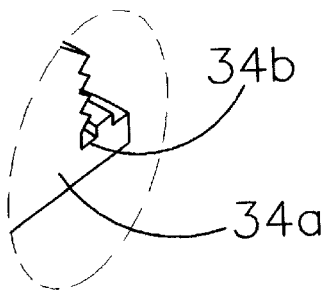
FIG. 5F

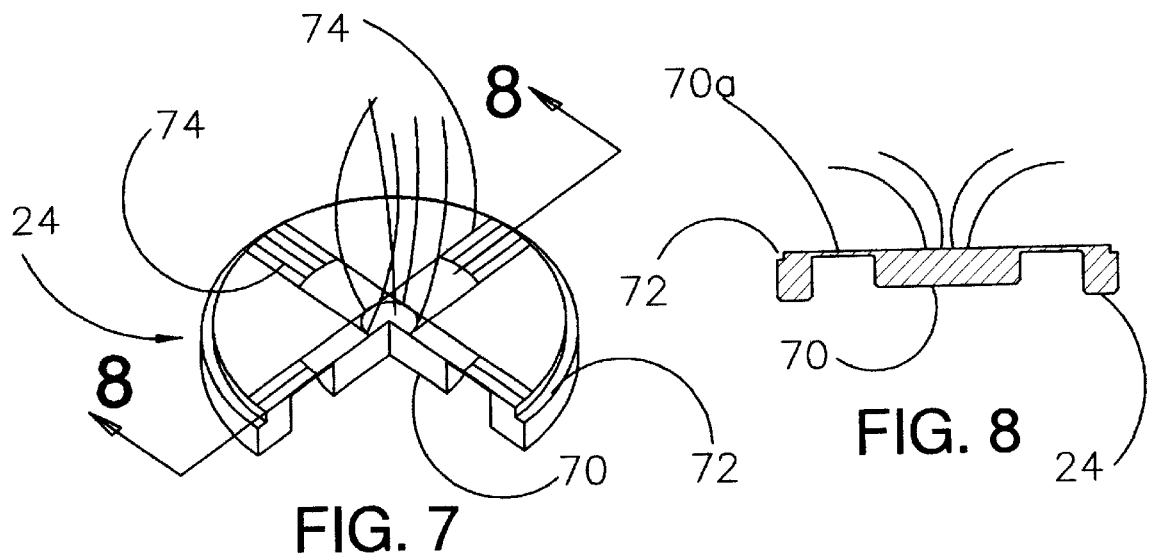
FIG. 7
FIG. 8
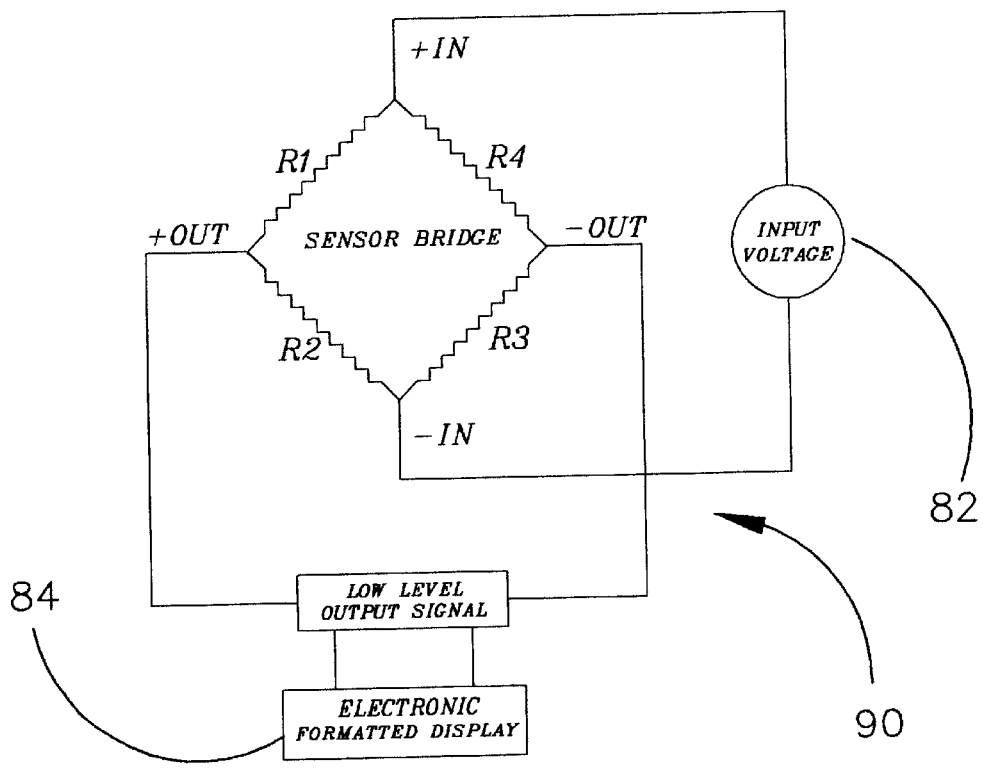
FIG. 9

PRESSURE SENSING DEVICE

BACKGROUND OF THE INVENTION

Pressure sensing devices are commonly used in a variety manufacturing and chemical processes. As discussed in U.S. Pat. No. 5,852,244, it is necessary in the manufacture of semi-conductor wafers to employ sensing devices which do not leak and contaminate the semiconductor wafers being produced. The highly corrosive fluids used in the manufacture of semi-conductive wafers flow through a passageway either made from or lined with an inert material, such as, for example a fluorocarbon polymer such a Teflon®. In the device disclosed in U.S. Pat. No. 5,852,244, a bore extends through and into the passageway and an isolation member is placed in this bore. Seals are employed to prevent leakage, but these seals may not be effective or deteriorate over prolonged periods. Consequently, it is highly desirable to provide a sensor which eliminates or minimizes the possibility of leakage.

SUMMARY OF THE INVENTION

In accordance with this invention, leakage is eliminated or minimized using redundant or dual barriers made of a chemically inert material instead of an isolation member mounted by seals in an opening next to the sensor. The chemically inert material is not reactive with highly corrosive fluids that have extreme pH levees either, highly acidic or basic.

This invention has several features, no single one of which is solely responsible for its desirable attributes. Without limiting the scope of this invention as expressed by the claims that follow, its more prominent features will now be discussed briefly. After considering this discussion, and particularly after reading the section entitled, "DETAILED DESCRIPTION OF THE PREFERRED EMBODIMENTS," one will understand how the features of this invention provide its benefits, which include, but are not limited to:

(a) redundant safety barriers to corrosive fluids, (b) ease of manufacture, assembly, and installation, (c) ease of temperature sensor integration, (d) no externally exposed metallic surfaces, and (e) lower maintenance, The first feature of the pressure sensing device of this invention is that it is adapted to measure the pressure of a corrosive fluid and includes a dual containment system. The device includes a chamber and uses a pressure sensor adjacent the chamber that provides a signal proportionate to the pressure of the fluid within the chamber. The chamber has (1) an inlet into which the fluid is introduced and an internal surface in contact with the fluid that is made of a material that does not react with the fluid and (2) a thin wall in contact with the sensor which is mounted outside to the chamber and next to the thin wall. The thin wall is less than about 0.05 inch, and preferably has a thickness of from about 0.005 to about 0.05 inch. This thin wall, being integral with the body of the chamber, acts as a secondary fluid containment barrier. There is primary containment barrier within the chamber made of a material that does not react with the fluid. This primary containment barrier comprises a liner that bears against the internal surfaces of the chamber. The liner is nested snugly within the chamber. The primary containment barrier may include a chemically inert plug having a chemically inert temperature probe therein.

The second feature is that the primary containment also has a thin wall that abuts and is contiguous with the thin wall of the chamber. The secondary and primary containment barriers have mating surfaces, and the sensor and thin wall of the chamber have mating surfaces. All these mating surfaces are in vacuum contact. Preferably, the mating surfaces form interference fit seals. For example, the interference fit seals may comprise tongue and groove components.

The third feature is that at the sensor has an interior surface with a predetermined profile, and the thin wall has a predetermined profile that is substantially the same as the predetermined profile of the interior surface of the sensor. Preferably, the predetermined profile of the interior surface of the sensor includes an annular groove and the predetermined profile of the thin wall includes an annular raised portion that fits snug within the annular groove in the interior surface of the sensor device. The thin wall diaphragm section having an exterior surface of a shape that conforms to the interior surface of the first thin wall diaphragm section and abuts and covers substantially the entire interior surface of the first thin wall diaphragm.

The forth feature is that the device includes a clamping mechanism that applies a uniformly distributed tie down load on the sensor. The clamping mechanism includes metallic elements that are enclosed with a chemically inert housing. This clamping mechanism includes a header member that overlies the sensor device and has a n interior surface that bears against the exterior surface of the sensor device, said interior surface of the header member and the exterior surface of the sensor device having elements therein that mate with each other. The interior surface of the header member has an outer edge with an outward extending rim and the sensor device has a disk shape with an upper outer edge that has a step therein. The rim i s seated on the step.

This invention also includes a sensor. This sensor includes a disk shaped support member having an exterior surface and an interior surface. The interior surface has a mating element adapted to interlock with a counterpart mating element on another structure. The exterior surface has with a bridge resistor circuit mounted thereon. The mating element comprises an annular grove that encompasses the bridge resistor circuit. The bridge resistor circuit provides a signal proportionate to the pressure of the fluid within chamber. Because the sensor is mounted to the exterior of the body member adjacent the thin wall, the sensor changes shape as the thin wall changes shape in response to changes in the pressure of the fluid within the chamber.

DESCRIPTION OF THE DRAWING

The preferred embodiments of this invention, illustrating all its features, will now be discussed in detail. These embodiments depict the novel and non-obvious pressure sensing device of this invention as shown in the accompanying drawing, which is for illustrative purposes only. This drawing includes the following Figures (FIGS.), with like numerals indicating like parts:

FIG. 5A is an enlarged fragmentary view taken along line 5A of FIG. 5.

FIG. 5B is an enlarged fragmentary view taken along line 5B of FIG. 5.

FIG. 5C is an enlarged fragmentary view taken along line 5C of FIG. 5.

FIG. 5D is an enlarged fragmentary view taken along line 5D of FIG. 5.

FIG. 5E is an enlarged fragmentary view taken along line 5E of FIG. 5.

FIG. 5F is an enlarged fragmentary view taken along line 5F of FIG. 5.

FIG. 7 is a perspective view of the sensor used to detect the pressure of the fluid flowing through pressure sensing device shown in FIG. 1.

FIG. 8 is a cross-sectional view taken along line 8—8 of FIG. 7.

FIG. 9 is a schematic wiring diagram of the bridge circuit carried by the sensor shown in FIG. 7.

FIG. 10a is an enlarged fragmentary view taken along line 10a of FIG. 10.

DESCRIPTION OF THE PREFERRED EMBODIMENTS

Figure 1:
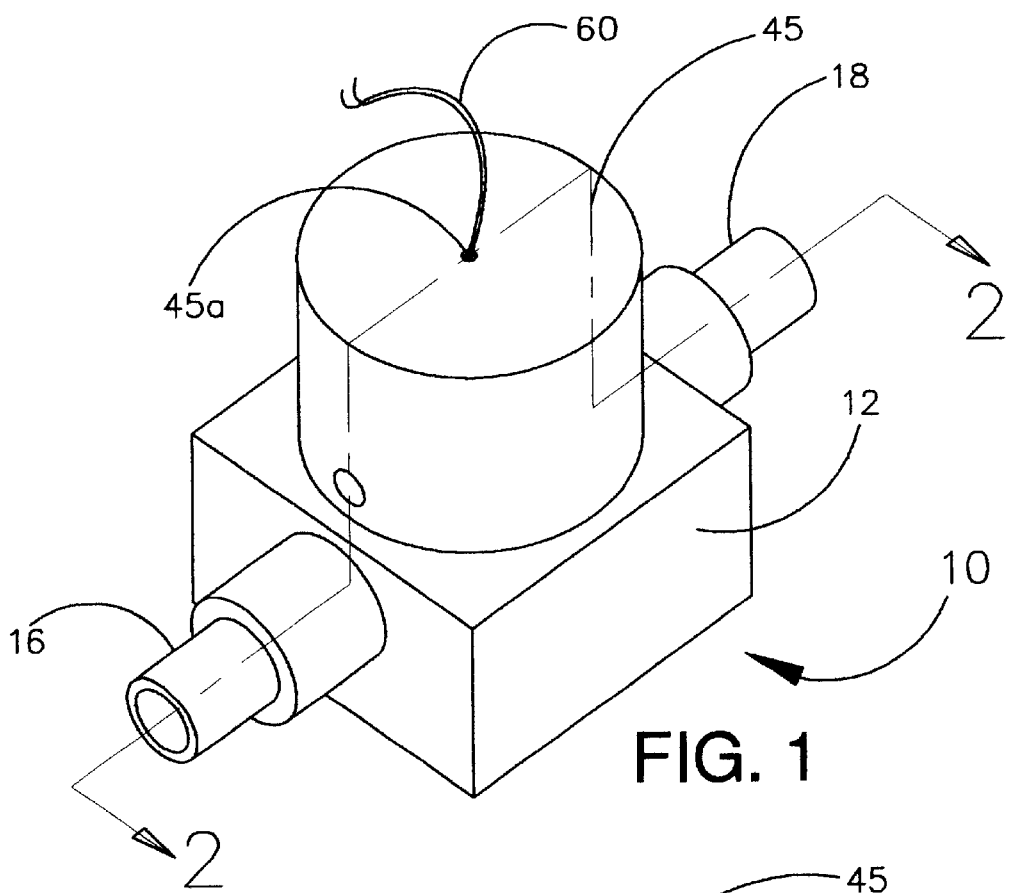
FIG. 1 is a perspective view of the pressure sensing device of this invention.
Figure 2:
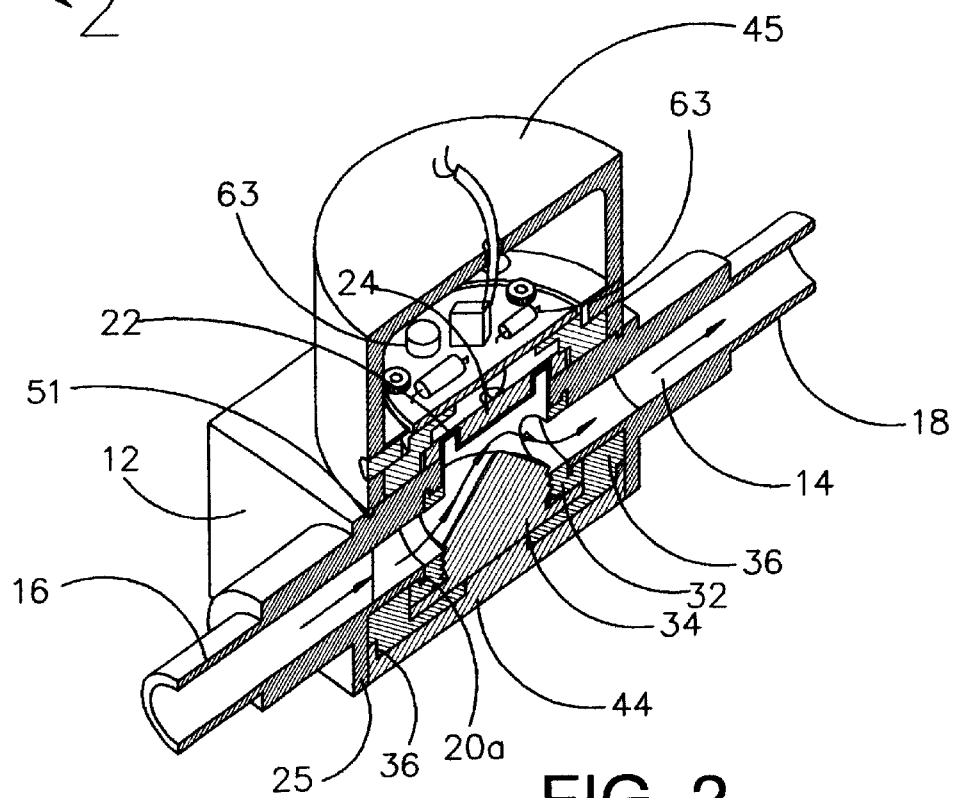
FIG. 2 is a perspective view, in cross section taken along the line 2—2 in FIG. 1, showing the major internal components of the device.

As shown in FIGS. 1 through 3B, the pressure sensing device 10 of this invention includes a body member 12 made of an inert material that does not react with the corrosive fluid (not shown) flowing through a chamber or passageway 14 extending through the body member 12. The passageway 14 has an inlet 16 projecting outward from the left side of the body member 12 as shown in FIG. 1 and an outlet 18 projecting from the right side of the body member 12 also as shown in FIG. 1. The central portion of the passageway 14 between the inlet 16 and the outlet 18 has a circular opening 20 therein defined by an annular lip 20a and a thin wall section 22 opposite this circular opening. The thin wall section 22 is in the form of a raised annular member on which is seated a disk-like sensor 24, the details of which are illustrated in FIGS. 7–9 and discussed subsequently. In this embodiment, a raised thin wall section is depicted, but the thin wall section could have other configurations and need not be raised. For example, the thin wall section may be flush with the exterior of the body member 12. The thin wall section 22 is integral with the body member 12, that is it is part of the body member and is not a separate structure. In the preferred embodiment, the thickness of the thin wall section 22 is 0.03 inch. This enables the thin wall section 22 to flex like a diaphragm and conform in shape to the interior surface of the sensor 24 in response to the changing pressure of the fluid flowing through the pressure sensing device 10. This flexing of the thin wall section 22 causes the sensor 24 to change shape or deflect and produce an electronic signal proportional to the pressure of the fluid.

As best shown in FIGS. 5A–5F and 6, the lower portion of the body member 12 has an internal cylindrical wall 25 that encircles the opening 20 in the passageway 14 opposite the thin wall section 22. A cylindrical-like liner member 32 is placed inside the passageway 14 and is seated snugly and press fitted against the internal surface 14a of the passageway, including the thin wall section 22. The liner member 32 has opposed side wall openings 91 and 93, with the longitudinal axis L of the body member 12 coinciding with the center line of these openings 91 and 93. The fluid flows along the passageway 14 through the openings 91 and 93 past the sensor 24, however, all that is required is a chamber be provided that allows contact between the fluid and the liner member 32, thin wall section 22, and sensor 24 assembly. Flow though is not required. An open cylindrical portion 33 passes through the opening 20. It may be force fitted in position or be threaded into position as depicted. A threaded plug 34 having a conical portion 34c is screwed into this open threaded portion 33. Press fitting the plug 34 in position is also acceptable rather than using threads. The linear member 32 and the plug 34 are held in position by a base ring 36 and a header 38. The header 38 preferably has a ring-like shape. There are aligned holes 28, 29, 30 and 31 (FIG. 3) in the base ring 36, body member 12, and header 38 that surround the thin wall section 22. Allen screws 40, passing through individual sleeves 42 seated in the body member 12, have their threaded ends screwed into threaded holes in the header 38 and their ends seated in the base ring 36. The base ring 36 has a central, circular open portion 36a. A circular shaped base cover 44 with a central raised circular portion is force fitted into the open portion 36a to hold the base cover in place.

There is an electronics board 41 mounted by screws 43 that pass through edge notches 41a in the electronics board and are threaded into holes 38b in the top surface the header 38. A top cover 45 covers the electronics board. Pins 47 pass through opposed orifices 47a in the sides of the top cover 45 and into slots 49 in the header 38 to hold the top cover in position. An annular lip 51 along the base edge of the top cover 45 fits snug into an annular groove 53 surrounding the assembly of the sensor 24, electronics board 41, and header 38. A central hole 45a in the cover 45 allows wires 60 from the electronics board 41 to extend outward from the pressure sensing device 10.

Figure 3:
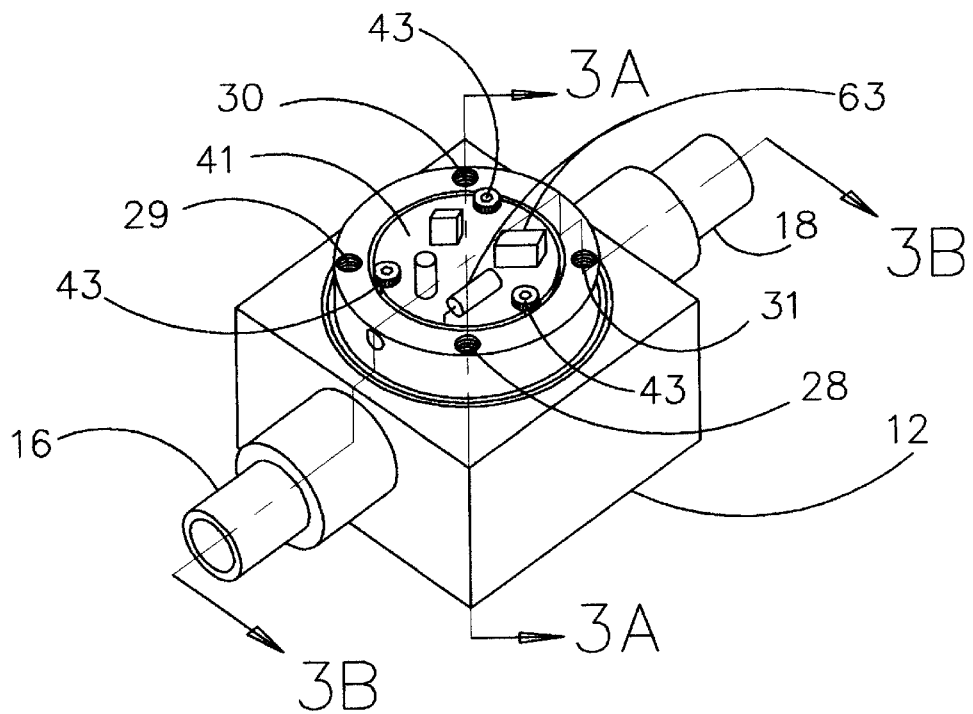
FIG. 3 is a perspective view of the pressure sensing device of this invention with its cover removed.
Figure 3A:
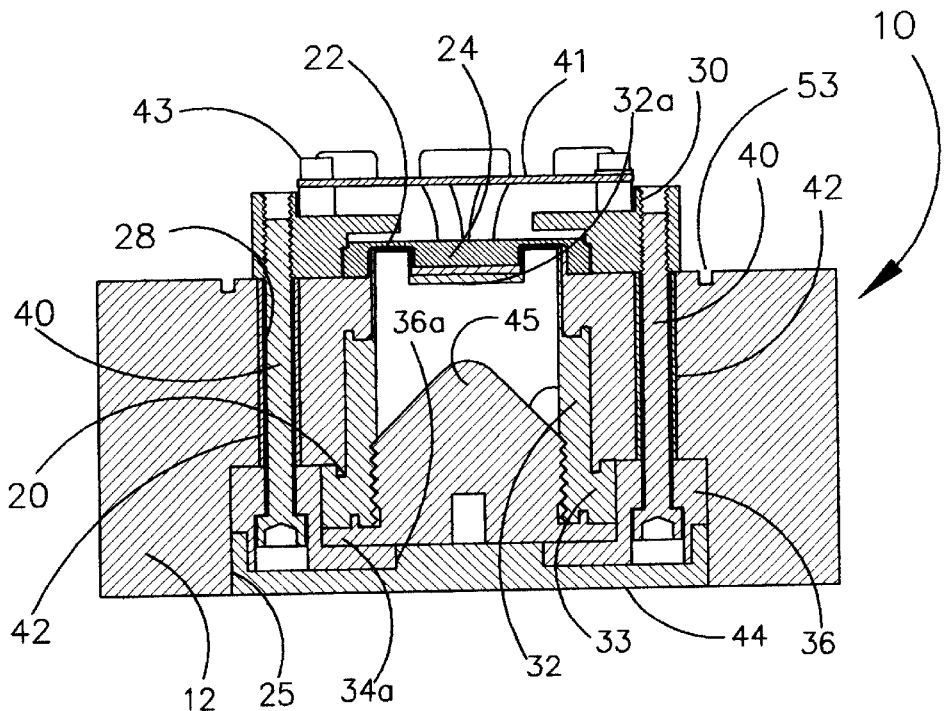
FIG. 3A is a cross-sectional view taken along line 3A—3A of FIG. 3.
Figure 3B:
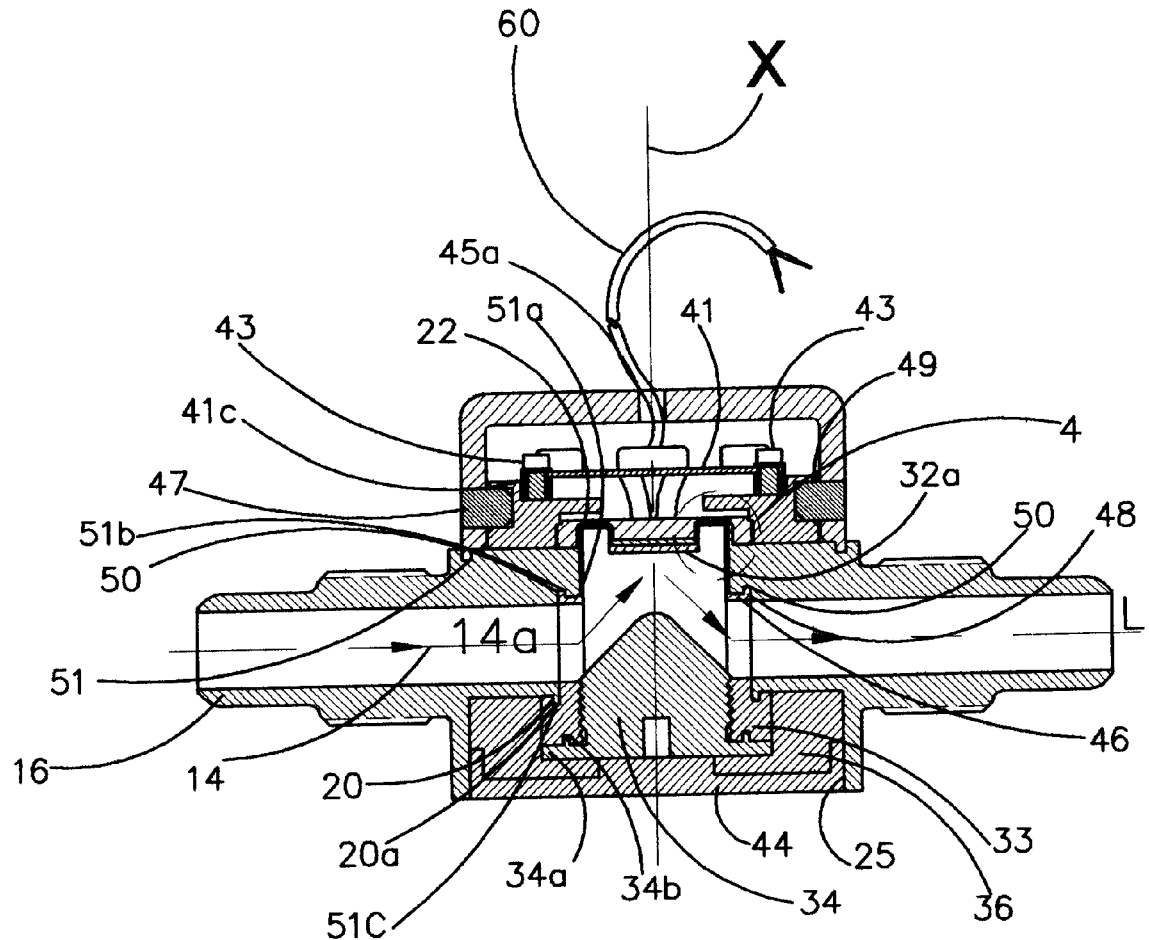
FIG. 3B is a cross-sectional view taken along line 3B—3B of FIG. 3.

The liner member 32 is made of an inert material that does not react with the corrosive fluid flowing through the pressure sensing device 10 and is designed to provide primary barrier against fluid leakage. In case of leakage through the liner member 32, the thin wall section 22 provides a secondary barrier to confine the fluid within the passageway 14. This liner member 32 conforms in shape to the interior surface of the thin wall section 22 and abuts and covers substantially the entire interior surface of the thin wall section 22 and central portion of the passageway wall 14a. Its upper portion 32a is configured as an annular ring which mates with the complimentary annular thin wall section 22 upon assembly. This upper portion 32a also has a thin wall construction that serves as a diaphragm section and is integral with the liner member 32. In the preferred embodiment, the thickness of the upper portion 32a is 0.03 inch. The upper portion 32a has a surrounding circular ledge 46 with an annular lip 48 at its end that mates with an annular groove 50 in the passageway wall 14a. This annular groove 50 is concentric with an axis x extending, as shown in FIG. 3B, through the centers of the top cover 45, the electronics board 41, the header 38, the sensor 24, the thin wall member 22, the liner member 32, the plug 34, the base ring 36, and the base cover 44. The lip 50 engages a male type annular rim 51a in the body member 12 and fits into an adjacent annular groove 51b in the body member 12. There is an annular groove 51c in the liner member 32 into which is force fitted a tongue or lip 51d in the body member 12. The plug 34 has a flange 34a with an annular lip 34b that is forced into an annular groove 32b in the bottom wall of the liner member 32. The raised annular upper section 32a fits snug within the annular recess provided in the thin wall section 22.

As illustrated in FIG. 8, the sensor 24 has a cross-sectional configuration substantially the same as the cross-sectional configuration of the thin wall section 22 and the raised annular upper section 32a of the liner member 32. Consequently, all these components fit in a mating relationship. The sensor 24, annular thin wall section 22, and raised annular upper section 32a of the liner member 32 are brought into intimate contact using conventional vacuum encapsulation techniques. Consequently, there is essentially no air between the mating surfaces of the sensor 24, annular thin wall section 22, and raised annular upper section 32a of the liner member 32. After vacuum encapsulation, the plug 34 is placed into the open portion 33 of the liner member 32 and the base ring and header 38 are secured in position using the Allen screws 40 as discussed above. The top cover 45 and the base cover 44 are put in place after the Allen screws are screwed into the header 38. The header 38 and base ring 36 are each made of aluminum and the Allen screws 40 and sleeves 42 are made of stainless steel, and it is best to avoid any possible contact of their metallic surfaces with corrosive chemicals. The use of the top cover 45 and base cover 44 provides an enclosure for these metallic surfaces that prevents attack by corrosive chemicals. The Allen screws 40 extend through the sleeves 42 inserted within the body member 12 and into the header 38. When the Allen screws 40 are tightened, the header 38 and base ring bear down and hold the components together snug and firm so that there is no leakage between any of the interfacing surfaces of the liner member 32 and the body member 12. There are hollow, threaded cylindrical stand offs 41c (FIG. 6) in the electronics board 41 extending from the underside of the board which line up with the openings 38b in the header 38 and the screws 43 pass through these stand offs 41c.

Figure 4:
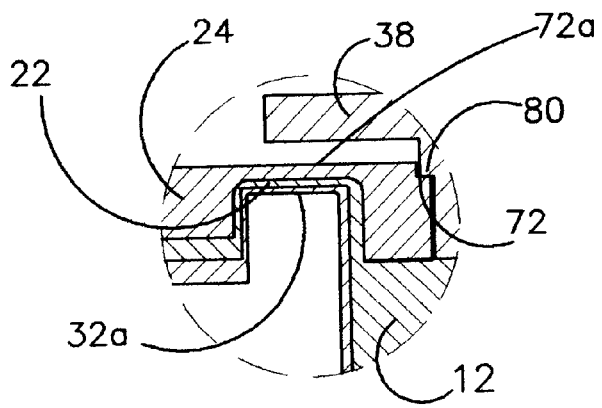
FIG. 4 is an enlarged fragmentary view taken along line 4 of FIG. 3B.
Figure 5:
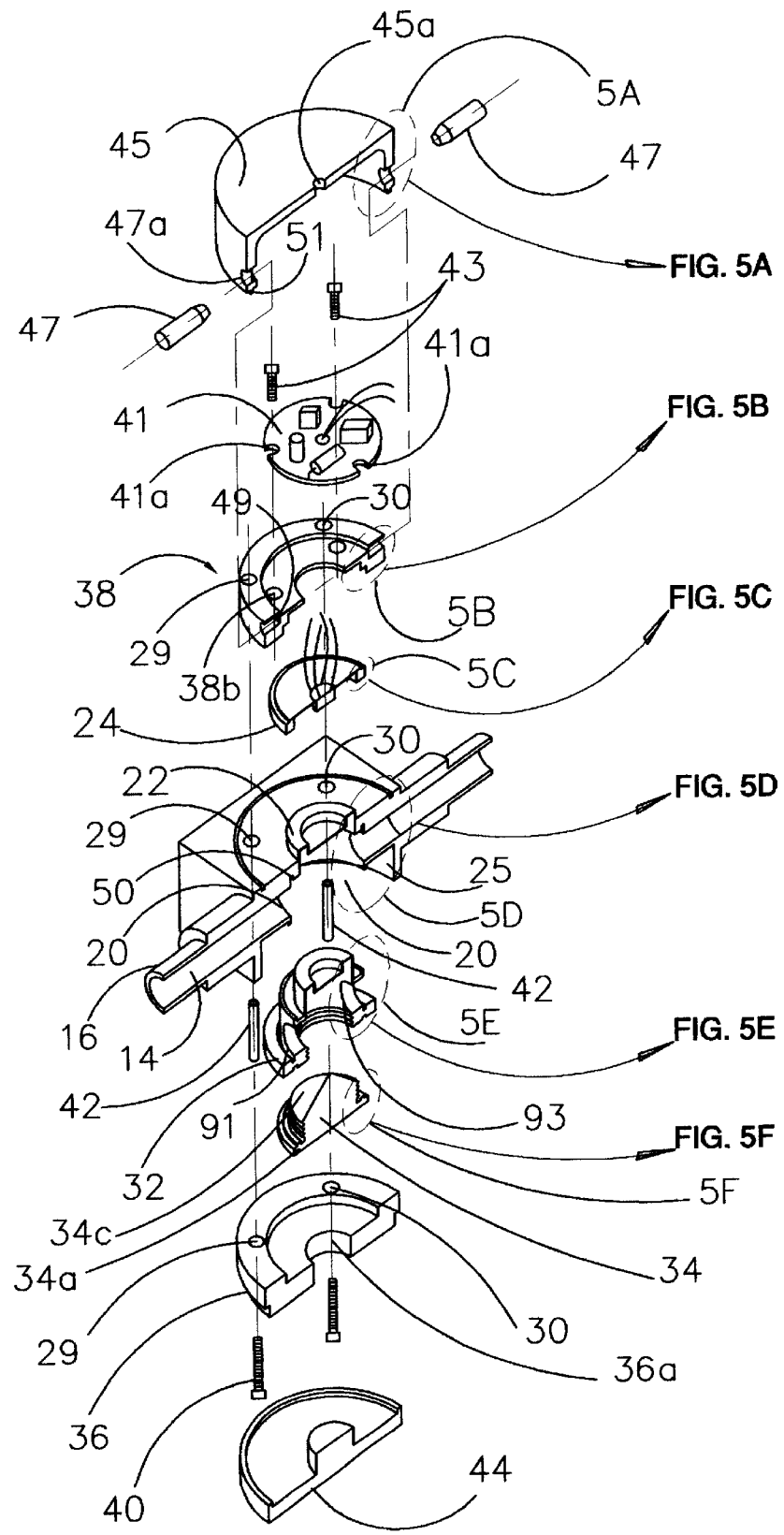
FIG. 5 is an exploded perspective view partially in cross section of the pressure sensing device shown in FIG. 1.
Figure 6:
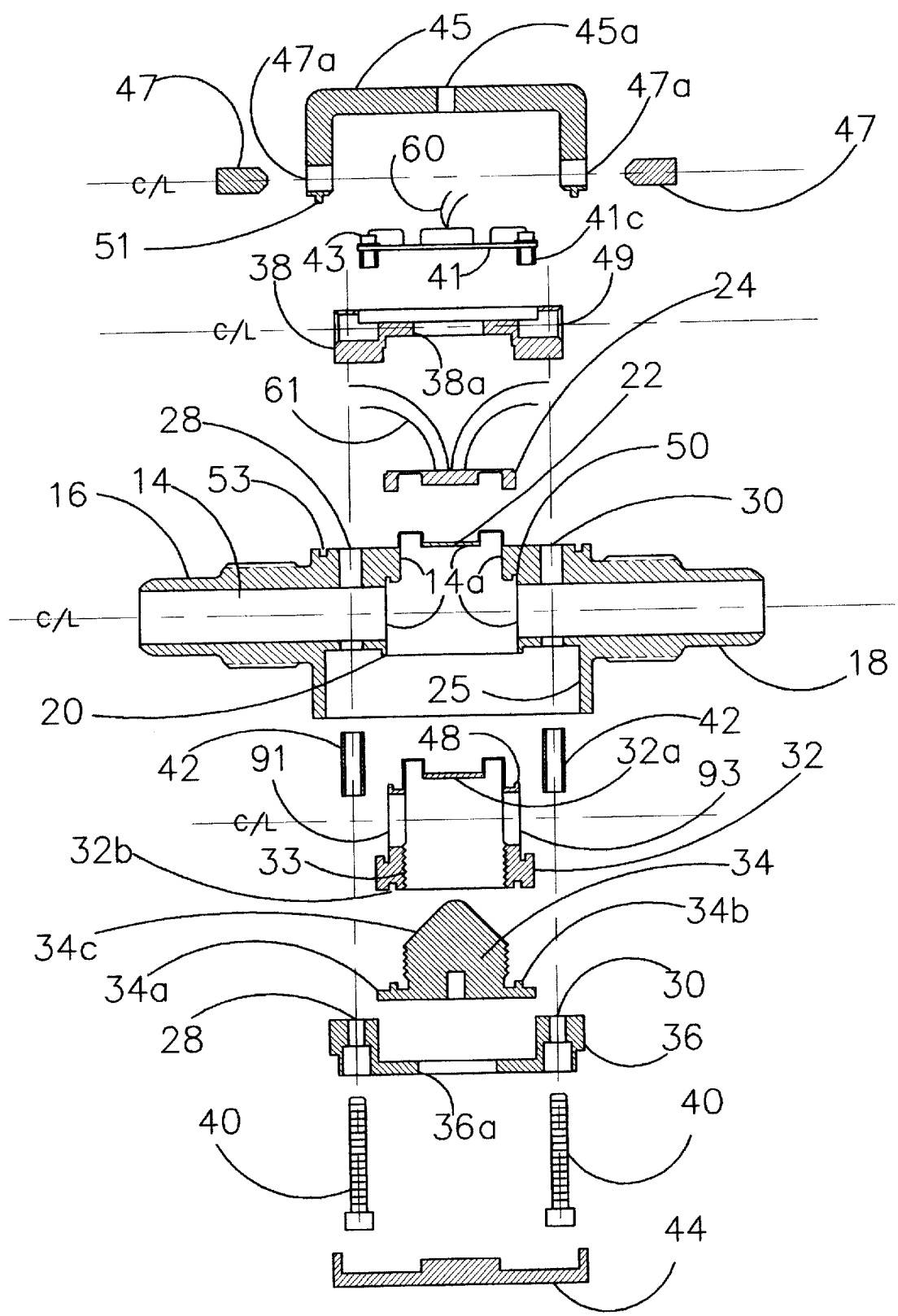
FIG. 6 is an exploded cross-sectional view of the pressure sensing device shown in FIG. 1.
Figure 10:
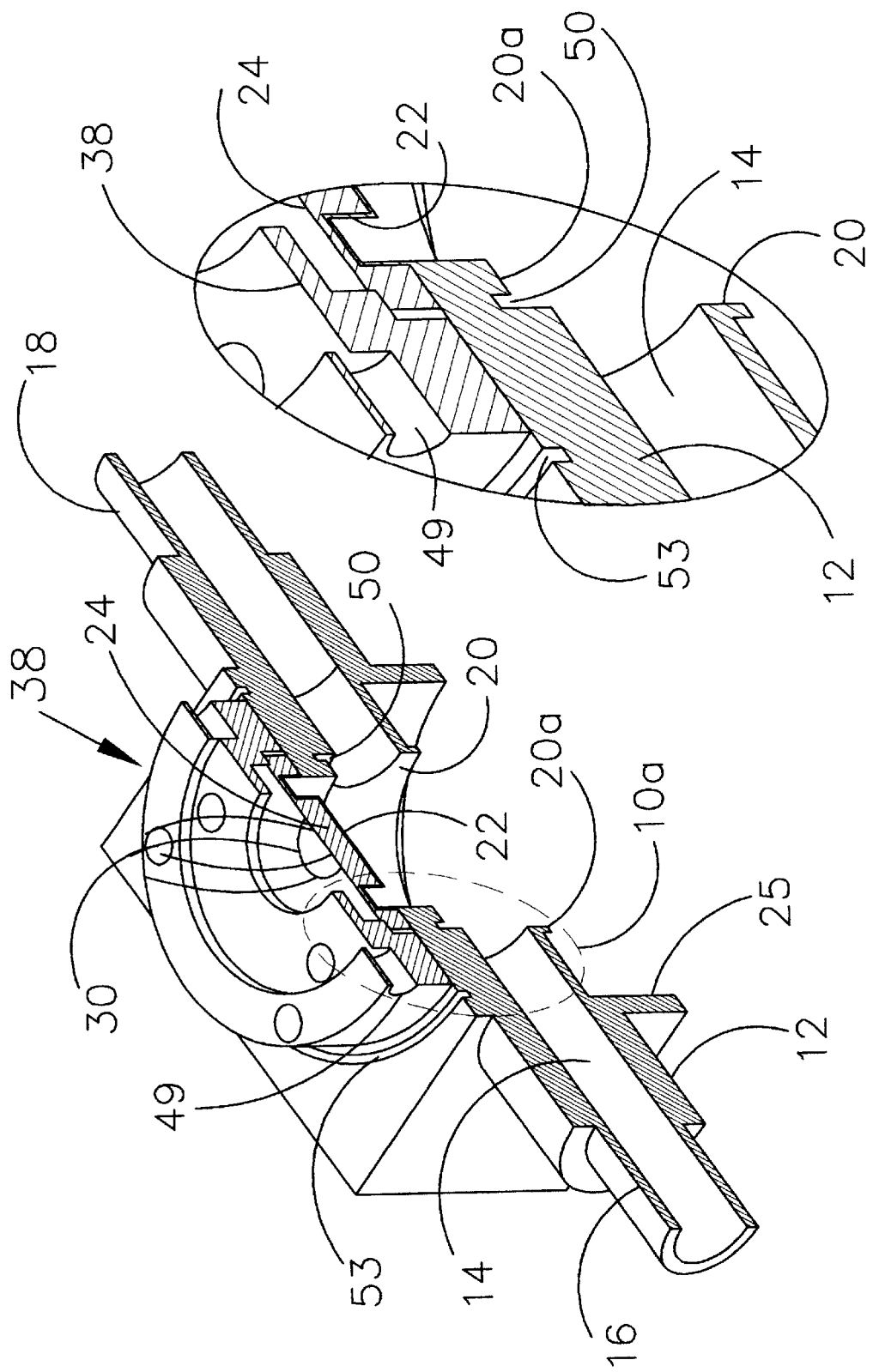
FIG. 10 is a perspective view, partially in cross-section, showing the assembly of the body member, sensor, and header.
Figure 11:
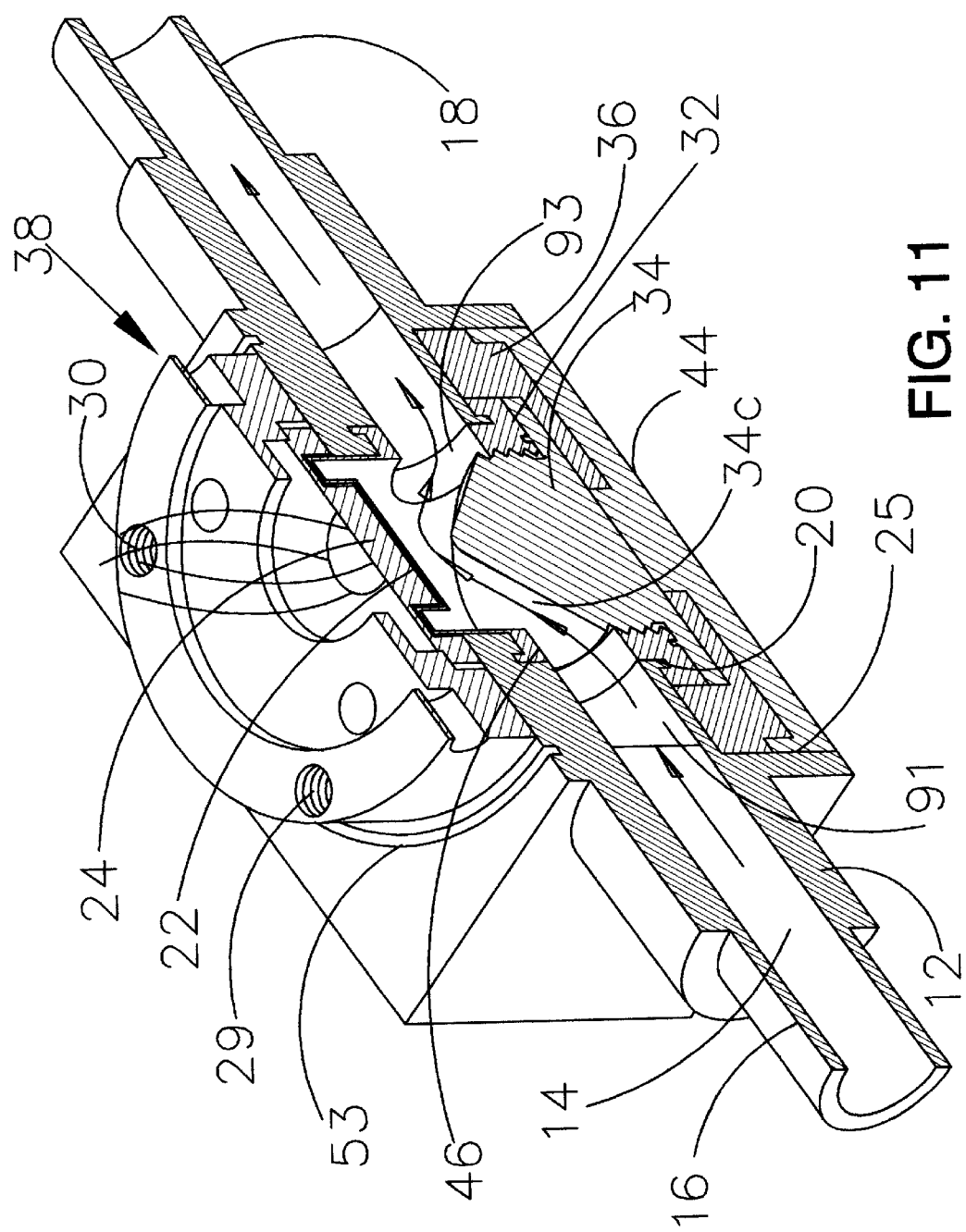
FIG. 11 is a perspective view, partially in cross-section, showing the liner member seated within the passageway of the body member with the base cover, plug, and base ring in position holding the liner member in position.

As illustrated in FIGS. 7–8, the pressure sensor 24 includes a solid metallic base member 70, for example, stainless steel. Its top surface 70a is coated with an insulating material such as, for example, silicon dioxide. Using conventional photolitographic techniques, thin metal films or strips 74 are applied over the insulating coating. The peripheral edge of this sensor 24 has a step 72 in it and, as best illustrated in FIG. 4, the header 38 has a corresponding shoulder 80 that is seated on this peripheral edge upon assembly as discussed above. The metal strips 74 are arranged in a cross-wise manner on the exterior surface 70a of the sensor 24. The deposited pattern of these metal strips serve as resistors R1 through R4 arranged in a bridge circuit 90 as depicted in FIG. 9. As the sensor 24 deflects, the change in shape of the resistors R1 through R4 causes the resistance of each resistor to change, varying the output voltage level. The input voltage is provided by a battery 82 and is maintained constant. The output voltage is displayed visually on an electronic display 84 and represents the pressure of the fluid flowing through the passageway 14. The advantages of this bridge circuit 90 using the resistors R1 through R4 over a change in capacitance circuit as taught by the prior art are as follows:

(a) a capacitance circuit is much more sensitive to temperature changes, (b) a resistance circuit employs a simple electronics to display the output signal, whereas a capacitance circuit requires multistage electronics to produce a usable output signal, (c) a resistance circuit is less susceptible to stray signal pick up, whereas a capacitance circuit uses lead wires that are highly susceptible to stray signal pick up and must be as short as possible, and (d) a resistance circuit is more stable than a capacitance circuit under changing environmental conditions such as, for example, shock, vibration, and temperature.

In operation, the corrosive fluid enters the pressure sensing device 10 through the inlet 16 and flows through the passageway 14, over the conical portion 34c of the plug 34, and out the outlet 18. As the pressure of this fluid changes, this change causes the upper section 32a of the liner member 32 to either press with greater or less pressure on the thin wall section 22, causing this thin wall section to change shape. This change in shape of the thin wall section 22 causes the sensor 24 to deflect, changing the resistance of resistors R1–R4 in the bridge circuit 90 to produce an output voltage corresponding to the new pressure. This output voltage is displayed as a pressure reading on the display 84.

Figure 12:
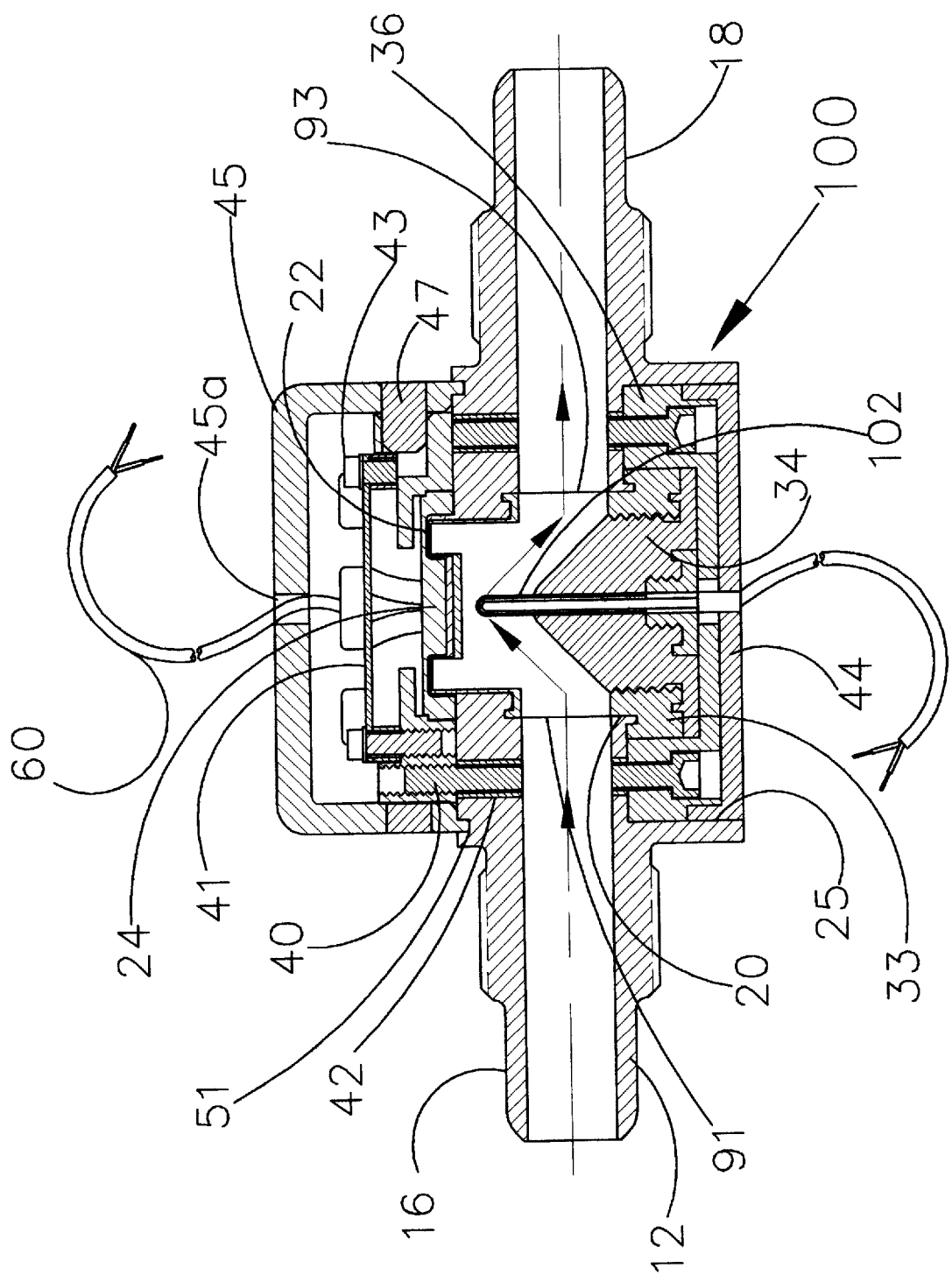
FIG. 12 is a cross-sectional view showing an alternate embodiment of this invention where the plug member has a temperature sensor extending outwardly therefrom into the passageway of the body member.

The pressure sensing device 100 depicted in FIG. 12 is an alternate embodiment. It is essentially the same as that depicted in FIG. 1, except the plug 34 has extending through it a temperature sensing device 102 such as a thermistor. The temperature sensing device 102 extends into the passageway 14 and senses the temperature of the fluid flowing through the passageway. This signal may be used to provide additional information for controlling the process for making the semi-conductive wafer. The temperature sensing device 102 has an exterior coated or otherwise covered with a chemically inert material that does not react to the corrosive fluid in the passageway 14.

General

In general, the pressure sensing device of this invention preferably includes a body member having a thin wall diaphragm section with a liner member having a thin wall diaphragm section abutting and substantially covering the interior surface of the body member's thin wall diaphragm section. The liner member is nested snugly within the body member, being subjected to a vacuum during assembly. They held in position by mating elements on the various components of the pressure sensing device of this invention and preferably interference press fits are employed to avoid or minimize leakage. The two thin wall diaphragm members respond in unison to the changing pressure of the fluid in the pressure sensing device to detect pressure changes. The use of two barriers, the liner member as the primary barrier and the outer thin wall section of the body member as the secondary barrier, virtually eliminate leakage. All the surfaces in contact with the corrosive fluid are chemically inert and any metallic components are enclosed within an enclosure that is made of a chemically inert material.

SCOPE OF THE INVENTION

The above presents a description of the best mode contemplated of carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above which are fully equivalent. Consequently, it is not the intention to limit this invention to the particular embodiments disclosed. On the contrary, the intention is to cover all modifications and alternate constructions coming within the spirit and scope of the invention as generally expressed by the following claims, which particularly point out and distinctly claim the subject matter of the invention.

What is claimed is:

1. A pressure sensing device adapted to measure pressure of a fluid, including
    a body member made of an inert material that does not react chemically with the fluid,
    said body member having an inlet into which the fluid is introduced and a thin wall diaphragm section integral with the body member, said thin wall section having an exterior surface and a n interior surface,
    a sensor device that provides a signal proportionate to the pressure of the fluid within the body member,
    said sensor device having exterior surface with a bridge resistor circuit mounted thereon and an interior surface with a predetermined profile, and
    said thin wall diaphragm section having a predetermined profile that is substantially the same as the predetermined profile of the interior surface of the sensor.

2. The pressure sensing device of claim 1 where the thin wall diaphragm section has a thickness that is less than 0.05 inch.

3. The pressure sensing device of claim 2 where the thin wall diaphragm section has a thickness of from 0.005 to 0.05 inch.

4. The pressure sensing device of claim 1 including a header member that overlies the sensor device and has an interior surface that bears against the exterior surface of the sensor device, said interior surface of the header member and the exterior surface of the sensor device having elements therein that mate with each other.

5. The pressure sensing device of claim 4 where
    the interior surface of the header member has an outer edge with an outward extending rim and the sensor device has a disk shape with an upper outer edge that has a step therein, said rim being seated on the step, and
    the predetermined profile of the interior surface of the sensor includes an annular groove and the predetermined profile of the thin wall diaphragm section includes an annular raised portion that fits snug within the annular groove in the interior surface of the sensor device.

6. A pressure sensing device adapted to measure pressure of a fluid, including
    a body member made of an inert material that does not react chemically with the fluid,
    said body member having an inlet into which the fluid is introduced and a first thin wall diaphragm section integral with the body member, said first thin wall diaphragm section having an exterior surface and an interior surface,
    a sensor device that provides a signal proportionate to the pressure of the fluid within body member,
    said sensor device having an exterior surface with a bridge resistor circuit mounted thereon and an interior surface with an annular groove therein,
    said first thin wall diaphragm section having an annular raised portion that fits snug within the annular groove in the interior surface of the sensor device,
    a header member that overlies the sensor device and has an interior surface that bears against the exterior surface of the sensor device, said interior surface of the header member and the exterior surface of the sensor device having elements therein that mate with each other, and
    a liner member made of an inert material that does not react chemically with the fluid and that fits within the body member adjacent the first thin wall diaphragm section and includes a second thin wall diaphragm section integral with the liner member,
    said second thin wall diaphragm section having an exterior surface of a shape that conforms to the interior surface of the first thin wall diaphragm section and abuts and covers substantially the entire interior surface of the first thin wall diaphragm.

7. The pressure sensing device of claim 6 where said first and second thin wall diaphragm sections each have a thickness that is less than 0.05 inch.

8. The pressure sensing device of claim 7 where the first and second thin wall diaphragm sections each have a thickness of from 0.005 to 0.05 inch.

9. The pressure sensing device of claim 6 where the interior surface of the header member has an outer edge with an outward extending rim and the sensor device has a disk shape with an upper outer edge that has a step therein, said rim being seated on the step.

10. The pressure sensing device of claim 6 where the body member and liner member have elements therein that mate with each other.

11. A pressure sensing device adapted to measure pressure of a fluid, including
    a body member having an exterior and made of an inert material that does not react chemically with the fluid,
    a liner member made of an inert material that does not react chemically with the fluid and seated within the body member,
    said body member and said liner member each having an inlet into which the fluid is introduced and a thin wall diaphragm section, said thin wall diaphragm section of the body member being integral therewith and said thin wall diaphragm section of the liner member being integral therewith, and said thin wall diaphragm sections of the body member and liner member being nested snugly together, and
    a sensor device that provides a signal proportionate to the pressure of the fluid within body member and is mounted to the exterior of the body member adjacent the thin wall diaphragm section of the body member in a manner that causes the sensor device to change shape as the thin wall diaphragm section changes shape in response to changes in the pressure of the fluid within the housing.

12. The pressure sensing device of claim 11 where the said thin wall diaphragm sections of the body member and liner member are at least in part contiguous and abutting.

13. The pressure sensing device of claim 12 where liner member nests within the body member and are brought into contact with each other using vacuum to substantially eliminate any gas therebetween.

14. The pressure sensing device of claim 11 where both the body member and the liner member have an inlet and an outlet and the fluid flows through the body member and the liner member during measurement of the pressure.

15. A pressure sensing device adapted to measure pressure of a fluid, including
   a body member having an exterior and made of an inert material that does not react chemically with the fluid,
   said body member having an inlet into which the fluid is introduced and a first thin wall diaphragm section integral with the body member, said first thin wall section having a thickness that is less than 0.05 inch and an exterior surface and an interior surface, and
   a sensor device that provides a signal proportionate to the pressure of the fluid within body member and is mounted to the exterior of the body member adjacent the exterior of the first thin wall diaphragm section of the body member in a manner that causes the sensor device to change shape as the first thin wall diaphragm section changes shape in response to changes in the pressure of the fluid within the body member.

16. The pressure sensing device of claim 15 including a header member that overlies the sensor device and has an interior surface that bears against an exterior surface of the sensor device, said interior surface of the header member and the exterior surface of the sensor device having elements therein that mate with each other.

17. The pressure sensing device of claim 15 including
   a liner member made of an inert material that does not react chemically with the fluid and that fits within the body member adjacent the first thin wall diaphragm section of the body member and includes a second thin wall diaphragm section integral with the liner member.

18. The pressure sensing device of claim 17 where said second thin wall diaphragm section has an exterior surface of a shape that conforms to the interior surface of the first thin wall diaphragm section and abuts and covers substantially the entire interior surface of the first thin wall diaphragm.

19. The pressure sensing device of claim 17 the body member and liner member having elements therein that mate with each other.

20. The pressure sensing device of claim 15 where the sensor device has an exterior surface with a bridge resistor circuit mounted thereon and an interior surface with a groove therein that mates with a raised portion on the exterior surface of the first thin wall diaphragm section.

21. A pressure sensing device adapted to measure the pressure of a corrosive fluid and including a dual containment system, said device comprising
   a pressure sensor,
   a chamber having an inlet into which the fluid is introduced and an internal surface in contact with the fluid that is made of a material that does not react with the fluid,
   said chamber having a thin wall in contact with the sensor which is mounted outside to the chamber and next to the thin wall, said sensor and wall having mating surfaces, and said thin wall acting as a secondary fluid containment barrier, and
   a primary containment barrier within the chamber made of a material that does not react with the fluid, said thin wall and primary containment barrier having mating surfaces,
   all said mating surfaces being in vacuum contact.

22. The device of claim 21 where the mating surfaces form interference fit seals.

23. The device of claim 22 where the mating surfaces forming interference fit seals are tongue and groove components.

24. The device of claim 21 where the primary containment barrier includes a plug adapted to receive a chemically inert plug having a chemically inert temperature probe therein.

25. The device of claim 21 including a clamping mechanism that applies a uniformly distributed tie down load on the sensor.

26. The device of claim 25 where the clamping mechanism includes metallic elements that are enclosed with a chemically inert housing.

27. A sensor comprising
   a disk shaped support member having an exterior surface and an interior surface,
   said interior surface having a mating element adapted to interlock with a counterpart mating element on another structure, and
   said exterior surface having with a bridge resistor circuit mounted thereon.

28. The sensor of claim 27 where the mating element comprises an annular grove that encompasses the bridge resistor circuit.

29. The sensor of claim 28 where the exterior surface has a peripheral edge with step therein.

30. A pressure sensing device adapted to measure pressure of a fluid, including
   a body member made of an inert material that does not react chemically with the fluid,
   said body member having a thin wall diaphragm section integral with the body member, said thin wall section having an exterior surface and an interior surface,
   a sensor device that provides a signal proportionate to the pressure of the fluid within the body member,
   said sensor device having exterior surface with a bridge resistor circuit mounted thereon and an interior surface,
   said interior surface of the sensor device and the interior surface of the thin wall diaphragm section being in intimate contact with each other.

31. A pressure sensing device adapted to measure pressure of a fluid, including
   a body member made of an inert material that does not react chemically with the fluid,
   said body member having an inlet into which the fluid is introduced and a thin wall diaphragm section integral with the body member, said thin wall section having an exterior surface and an interior surface,
   a sensor device that provides a signal proportionate to the pressure of the fluid within the body member,
   said sensor device having exterior surface with a bridge resistor circuit mounted thereon and an interior surface with a predetermined profile, and
   said thin wall diaphragm section having a predetermined profile that is substantially the same as the predetermined profile of the interior surface of the sensor device,
   said interior surface of the sensor device and the interior surface of the thin wall diaphragm section being in intimate contact with each other.

32. A pressure sensing device adapted to measure pressure of a fluid, including
   a body member having an exterior and made of an inert material that does not react chemically with the fluid,
   said body member having a thin wall diaphragm section integral with the housing, said thin wall diaphragm section having a thickness that is less than 0.05 inch and an exterior surface and an interior surface, and a sensor device that provides a signal proportionate to the pressure of the fluid within body member and is mounted to the exterior of the body member adjacent the exterior surface of the thin wall diaphragm section of the body member and in intimate contact therewith to cause the sensor device to change shape as the thin wall diaphragm section changes shape in response to changes in the pressure of the fluid within the housing.

33. A pressure sensing device adapted to measure pressure of a fluid, including a body member made of an inert material that does not react chemically with the fluid, said body member including a thin wall diaphragm section integral with the body member, said thin wall diaphragm section having a n exterior surface and an interior surface, and a sensor device that provides a signal proportionate to the pressure of the fluid within the body member, said sensor device including a substantially disk shaped support member having an exterior surface and an interior surface, said interior surface of the disk shaped support member having a mating element that interlocks with a counterpart mating element on said body member, and the exterior surface of the disk shaped support member having a bridge resistor circuit mounted thereon, said interior surface of the disk shaped support member and the interior surface of the thin wall diaphragm section each having substantially the same predetermined profile and being nested snugly together in intimate contact with each other.

34. A pressure sensing device adapted to measure pressure of a fluid, including a body member made of an inert material that does not react chemically with the fluid, said body member having a thin wall diaphragm section integral with the body member, said thin wall section having an exterior surface and an interior surface, and a sensor device that provides a signal proportionate to the pressure of the fluid within the body member, said sensor device having exterior surface with a bridge resistor circuit mounted thereon and an interior surface, and said interior surface of the sensor device and the interior surface of the thin wall diaphragm section being in intimate contact with each other through the application of a vacuum.

35. The pressure sensing device according to claim 34 where said interior surface of the sensor device and the interior surface of the thin wall diaphragm section each have substantially the same predetermined profile and are nested snugly together.

* * * * *